(12) United States Patent
Ohnishi et al.

(10) Patent No.: US 10,038,392 B2
(45) Date of Patent: Jul. 31, 2018

(54) INVERTER

(71) Applicants: TOSHIBA MITSUBISHI-ELECTRIC INDUSTRIAL SYSTEMS CORPORATION, Chuo-ku (JP); Mitsubishi Electric Corporation, Chiyoda-ku (JP)

(72) Inventors: Keisuke Ohnishi, Chuo-ku (JP); Masahiro Kinoshita, Chuo-ku (JP); Kimiyuki Koyanagi, Chiyoda-ku (JP)

(73) Assignees: TOSHIBA MITSUBISHI-ELECTRIC INDUSTRIAL SYSTEMS CORPORATION, Chuo-ku (JP); Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/502,625

(22) PCT Filed: Aug. 29, 2014

(86) PCT No.: PCT/JP2014/072694
§ 371 (c)(1),
(2) Date: Feb. 8, 2017

(87) PCT Pub. No.: WO2016/031037
PCT Pub. Date: Mar. 3, 2016

(65) Prior Publication Data
US 2017/0237359 A1    Aug. 17, 2017

(51) Int. Cl.
*H02M 1/08* (2006.01)
*H02M 7/537* (2006.01)
(Continued)

(52) U.S. Cl.
CPC ............. *H02M 7/537* (2013.01); *H02J 9/062* (2013.01); *H02M 1/08* (2013.01); *H02M 2001/0054* (2013.01)

(58) Field of Classification Search
CPC ............ H02M 1/08; H02M 1/38; H02M 7/42; H02M 7/44; H02M 7/515; H02M 2001/0054; H02J 9/062
See application file for complete search history.

(56) References Cited

U.S. PATENT DOCUMENTS 8,665,619 B2 * 3/2014 Cui ..................... H02M 1/34
363/132
2013/0223114 A1    8/2013 Nakayama et al.
(Continued)

FOREIGN PATENT DOCUMENTS

JP    2001-45772 A    2/2001
JP    2002-247862 A    8/2002
(Continued)

OTHER PUBLICATIONS

International Search Report dated Dec. 2, 2014 in PCT/JP2014/072694 Filed Aug. 29, 2014.
(Continued)

*Primary Examiner* — Matthew Nguyen
(74) *Attorney, Agent, or Firm* — Oblon, McClelland, Maier & Neustadt, L.L.P.

(57) ABSTRACT

An inverter includes: a first transistor (Q1) connected between a first input terminal (T1) and an output terminal (T4); a second transistor (Q2) connected between the output terminal (T4) and a second input terminal (T2); first and second diodes (D1, D2) connected in anti-parallel to the first and second transistors (Q1, Q2), respectively; and a bidirectional switch that is connected between a third input terminal (T3) and the output terminal (T4) and that includes third and fourth transistors (Q3, Q4) and third and fourth diodes (D3, D4). The first and second transistors (Q1, Q2) and the third and fourth diodes (D3, D4) are each formed of a wide band gap semiconductor. The third and fourth tran- (Continued)

sistors (Q3, Q4) and the first and second diodes (D1, D2) are each formed of a semiconductor other than the wide band gap semiconductor.

10 Claims, 7 Drawing Sheets

(51) Int. Cl.
*H02J 9/06* (2006.01)
*H02M 1/00* (2006.01)

(56) References Cited

U.S. PATENT DOCUMENTS

2015/0263568 A1* 9/2015 Colombi .................. H02J 9/061
307/65

2016/0028224 A1* 1/2016 Yamada ................ H02M 7/487
363/56.11

FOREIGN PATENT DOCUMENTS

| JP | 2011-78296 A | 4/2011 |
| JP | 2013-223357 A | 10/2013 |
| WO | 2012/056766 A1 | 5/2012 |

OTHER PUBLICATIONS

Japanese Office Action dated Jul. 4, 2017 in Japanese Patent Application No. 2016-545181 (with English translation).

Office Action dated Jan. 3, 2018 in Canadian Patent Application No. 2,959,451.

* cited by examiner

(a) Si TRANSISTOR (b) SiC TRANSISTOR

INVERTER

TECHNICAL FIELD

The present invention relates to inverters, and particularly to an inverter configured to convert first to third direct-current (DC) voltages into a three-level alternating-current (AC) voltage.

BACKGROUND ART

Japanese Patent Laying-Open No. 2011-78296 (PTD 1) discloses an inverter including four transistors and four diodes, and configured to convert a high voltage, a low voltage and an intermediate voltage into a three-level AC voltage. According to this inverter, among four diodes, each of two diodes performing a reverse recovery operation is formed of a wide band gap semiconductor, thereby reducing recovery loss. Also, each of two diodes not performing a reverse recovery operation is formed of a semiconductor other than such a wide band gap semiconductor, thereby reducing cost.

CITATION LIST

Patent Document

PTD 1: Japanese Patent Laying-Open No. 2011-78296

SUMMARY OF INVENTION

Technical Problem

In the conventional inverter, however, four transistors have been formed of the same type of semiconductor, still leading to higher loss and higher cost.

Therefore, a main object of the present invention is to provide an inverter with reduced loss and cost.

Solution to Problem

An inverter according to the present invention is configured to convert a first DC voltage applied to a first input terminal, a second DC voltage applied to a second input terminal, and a third DC voltage applied to a third input terminal into a three-level AC voltage, and output the three-level AC voltage through an output terminal. The inverter includes: a first transistor having a first electrode and a second electrode that are connected to the first input terminal and the output terminal, respectively; a second transistor having a first electrode and a second electrode that are connected to the output terminal and the second input terminal, respectively; a first diode and a second diode connected in anti-parallel to the first transistor and the second transistor, respectively; and a bidirectional switch connected between the third input terminal and the output terminal. The first DC voltage is higher than the second DC voltage, and the third DC voltage is an intermediate voltage between the first DC voltage and the second DC voltage. The bidirectional switch includes a third transistor, a fourth transistor, a third diode, and a fourth diode. Each of the first transistor, the second transistor, the third diode, and the fourth diode is formed of a wide band gap semiconductor. Each of the third transistor, the fourth transistor, the first diode, and the second diode is formed of a semiconductor other than the wide band gap semiconductor.

Advantageous Effects of Invention

In the inverter according to the present invention, the first and second transistors switching a current, and the third and fourth diodes performing a reverse recovery operation are each formed of a wide band gap semiconductor, so that the switching loss and the recovery loss can be reduced. Also, the third and fourth transistors not switching a current, and the first and second diodes not performing a reverse recovery operation are each formed of a semiconductor other than a wide band gap semiconductor, so that the cost can be reduced.

DESCRIPTION OF EMBODIMENTS

First Embodiment

Figure 1:
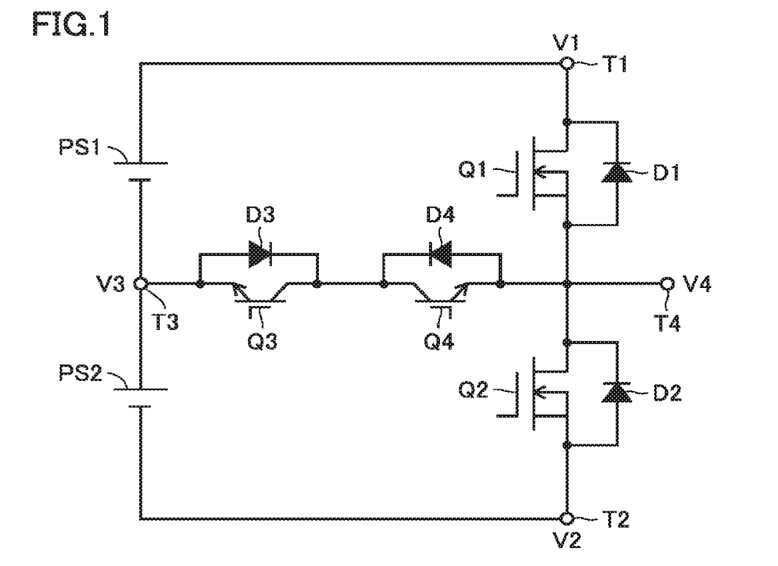
FIG. 1 is a circuit block diagram showing the configuration of an inverter according to the first embodiment of the present invention.

FIG. 1 is a circuit block diagram showing the configuration of an inverter according to the first embodiment of the present invention. In FIG. 1, this inverter includes input terminals T1 to T3, an output terminal T4, transistors Q1 to Q4, and diodes D1 to D4.

A DC power supply PS1 has a positive electrode and a negative electrode that are connected to input terminals T1 and T3, respectively. A DC power supply PS2 has a positive electrode and a negative electrode that are connected to input terminals T3 and T2, respectively. Each of DC power supplies PS1 and PS2 outputs a DC voltage. The output voltage of DC power supply PS1 and the output voltage of DC power supply PS2 are equal to each other. Accordingly, DC voltages V1, V2 and V3 are applied to input terminals T1, T2 and T3, respectively, which leads to conditions of V1>V3>V2 and V3=(V1+V2)/2. This inverter serves to convert DC voltages V1 to V3, which have been applied to input terminals T1 to T3, respectively, into a three-level AC voltage V4, and output AC voltage V4 through output terminal T4. In addition, when input terminal T3 is grounded, DC voltages V1, V2 and V3 are to be set at a positive voltage, a negative voltage and 0V, respectively.

Each of transistors Q1 and Q2 is an N-channel MOS transistor formed using SiC (silicon carbide) that is a wide band gap semiconductor. The rated current in each of transistors Q1 and Q2 is, for example, 600A that is greater than the rated current in each of transistors Q3, Q4 and diodes D1 to D4.

Each of transistors Q3 and Q4 is an insulated gate bipolor transistor (IGBT) formed using Si (silicon) that is a semiconductor other than a wide band gap semiconductor. The rated current in each of transistors Q3 and Q4 is 450 A, for example.

Each of diodes D1 and D2 is formed using Si (silicon) that is a semiconductor other than a wide band gap semiconductor. The rated current in each of diodes D1 and D2 is 300 A, for example.

Each of diodes D3 and D4 is a Schottky barrier diode formed using SiC (silicon carbide) that is a wide band gap semiconductor. The rated current in each of diodes D3 and D4 is 500 A, for example.

In this way, transistors Q1 and Q2 are different in specification from transistors Q3 and Q4, and diodes D1 and D2 are different in specification from diodes D3 and D4, the reason for which will be described later.

Transistor Q1 has a drain (first electrode) connected to input terminal T1, and a source (second electrode) connected to output terminal T4. Diode D1 has an anode connected to output terminal T4, and a cathode connected to input terminal T1.

Transistor Q2 has a drain connected to output terminal T4, and a source connected to input terminal T2. Diode D2 has an anode connected to input terminal T2, and a cathode connected to output terminal T4. In other words, diodes D1 and D2 are connected in anti-parallel to transistors Q1 and Q2, respectively.

Transistors Q3 and Q4 have collectors (first electrodes) that are connected to each other. Transistors Q3 and Q4 have emitters (second electrodes) that are connected to input terminal T3 and output terminal T4, respectively. Diodes D3 and D4 have cathodes that are connected to collectors of transistors Q3 and Q4, respectively, and anodes that are connected to input terminal T3 and output terminal T4, respectively. In other words, diodes D3 and D4 are connected in anti-parallel to transistors Q3 and Q4, respectively. Transistors Q3, Q4 and diodes D3, D4 form a bidirectional switch.

Figure 2:
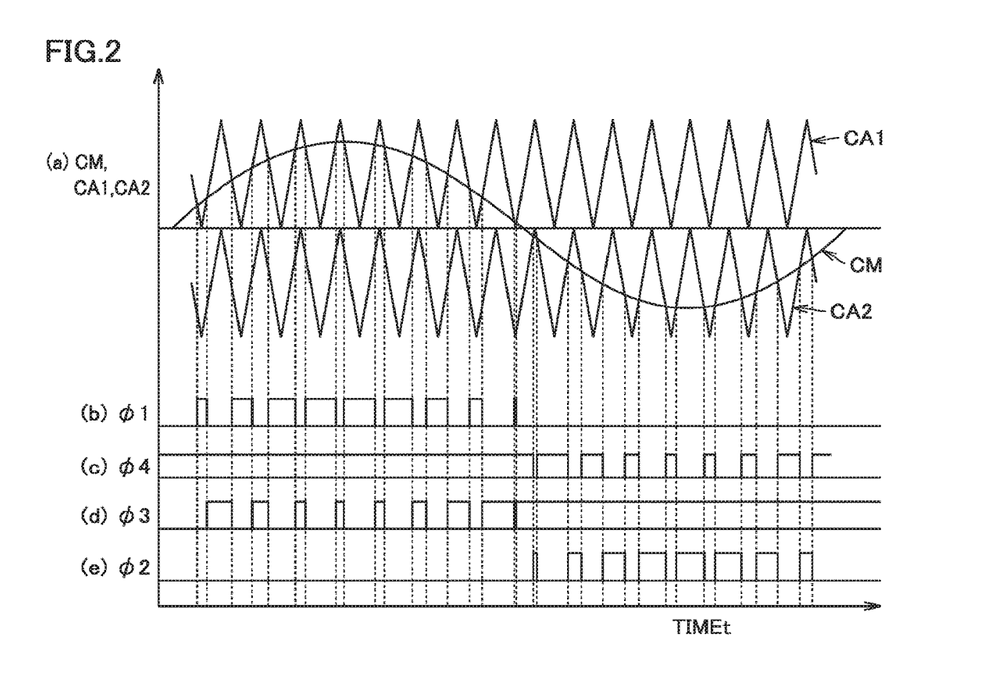
FIG. 2 is a time chart showing waveforms of four PWM signals that control four transistors, respectively, shown in FIG. 1.

Then, the operation of this inverter will be hereinafter described. Transistors Q1 to Q4 have gates to which PWM signals $\phi 1$ to $\phi 4$, respectively, are supplied. FIGS. 2(a) to 2(e) each show a method of generating PWM signals $\phi 1$ to $\phi 4$, and waveforms. Specifically, FIG. 2(a) shows waveforms of a sinusoidal wave command value signal CM, a positive-side triangular wave carrier signal CA1 and a negative-side triangular wave carrier signal CA2. FIGS. 2(b), 2(c), 2(d), and 2(e) show the waveforms of PWM signals $\phi 1$, $\phi 4$, $\phi 3$, and $\phi 2$, respectively.

In FIGS. 2(a) to 2(e), the frequency of sinusoidal wave command value signal CM is a commercial frequency, for example. Carrier signals CA1 and CA2 have the same cycle and the same phase. The cycles of carrier signals CA1 and CA2 are sufficiently smaller than the cycle of sinusoidal wave command value signal CM.

The high-low levels of sinusoidal wave command value signal CM and positive-side triangular wave carrier signal CA1 are compared with each other. When the level of sinusoidal wave command value signal CM is higher than the level of positive-side triangular wave carrier signal CA1, PWM signals $\phi 1$ and $\phi 3$ are set at an "H" level and an "L" level, respectively. When the level of sinusoidal wave command value signal CM is lower than the level of positive-side triangular wave carrier signal CA1, PWM signals $\phi 1$ and $\phi 3$ are set at an "L" level and an "H" level, respectively.

Accordingly, in a time period during which the level of sinusoidal wave command value signal CM is positive, PWM signals $\phi 1$ and $\phi 3$ are alternately set at an "H" level in synchronization with carrier signal CA1, and thus, transistors Q1 and Q3 are alternately turned on. Furthermore, in a time period during which the level of sinusoidal wave command value signal CM is negative, PWM signals $\phi 1$ and $\phi 3$ are fixed at an "L" level and an "H" level, respectively, so that transistor Q1 is fixed in an OFF state and transistor Q3 is fixed in an ON state.

The high-low levels of sinusoidal wave command value signal CM and negative-side triangular wave carrier signal CA2 are compared with each other. When the level of sinusoidal wave command value signal CM is higher than the level of negative-side triangular wave carrier signal CA2, PWM signals $\phi 2$ and $\phi 4$ are set at an "L" level and an "H" level, respectively. When the level of sinusoidal wave command value signal CM is lower than the level of negative-side triangular wave carrier signal CA2, PWM signals $\phi 2$ and $\phi 4$ are set at an "H" level and an "L" level, respectively.

Accordingly, in a time period during which the level of sinusoidal wave command value signal CM is positive, PWM signals $\phi 2$ and $\phi 4$ are fixed at an "L" level and an "H" level, respectively, and thus, transistor Q2 is fixed in the OFF state and transistor Q4 is fixed in the ON state. Furthermore, in a time period during which the level of sinusoidal wave command value signal CM is negative, PWM signals $\phi 2$ and $\phi 4$ are alternately set at an "H" level in synchronization with carrier signal CA2, and transistors Q2 and Q4 are alternately turned on.

The ratio between the time in which the PWM signal is set at an "H" level within one cycle and the time of one cycle of the PWM signal is referred to as a duty ratio. In a time period during which the level of sinusoidal wave command value signal CM is positive, the duty ratio of PWM signal $\phi 1$ is maximized in the vicinity of a positive peak (90 degrees) of sinusoidal wave command value signal CM. Also, the duty ratio of PWM signal $\phi 1$ decreases with increasing distance from the peak, and reaches 0 in the vicinity of 0 degree and 180 degrees. The duty ratio of PWM signal $\phi 1$ is fixed at 0 in a time period during which the level of sinusoidal wave command value signal CM is negative. PWM signal $\phi 3$ is a complementary signal of PWM signal $\phi 1$.

The duty ratio of PWM signal $\phi 2$ is fixed at 0 in a time period during which the level of sinusoidal wave command value signal CM is positive. The duty ratio of PWM signal $\phi 2$ is maximized in the vicinity of a negative peak (270 degrees) of sinusoidal wave command value signal CM. Also, the duty ratio of PWM signal $\phi 2$ decreases with increasing distance from the peak, and reaches 0 in the vicinity of 180 degrees and 360 degrees. PWM signal $\phi 4$ is a complementary signal of PWM signal $\phi 2$.

Figure 3:
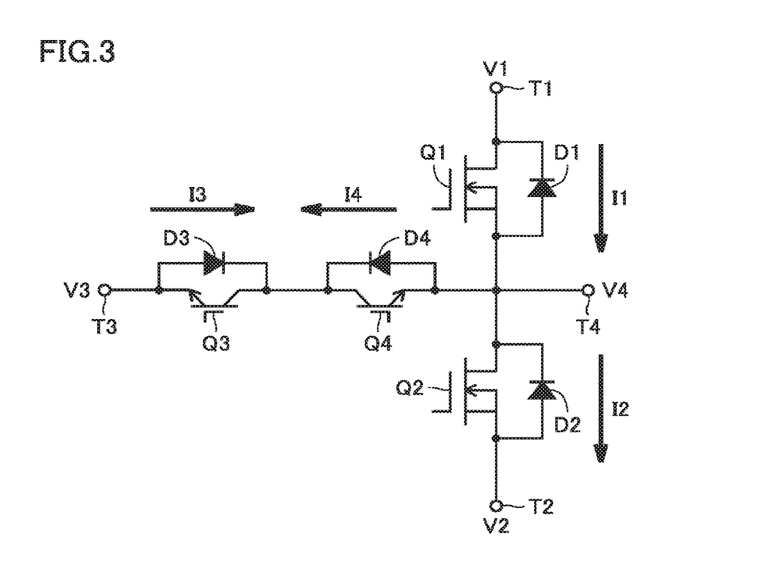
FIG. 3 is a circuit diagram for illustrating a current flowing through an inverter shown in FIG. 1.

Then, the current flowing through each of transistors Q1 to Q4 and diodes D1 to D4 during the operation of the inverter will be hereinafter described. As shown in FIG. 3, the current flowing from input terminal T1 into output terminal T4 is defined as I1, the current flowing from output terminal T4 into input terminal T2 is defined as I2, the current flowing from input terminal T3 into output terminal T4 is defined as I3, and the current flowing from output terminal T4 into input terminal T3 is defined as I4.

Figure 4:
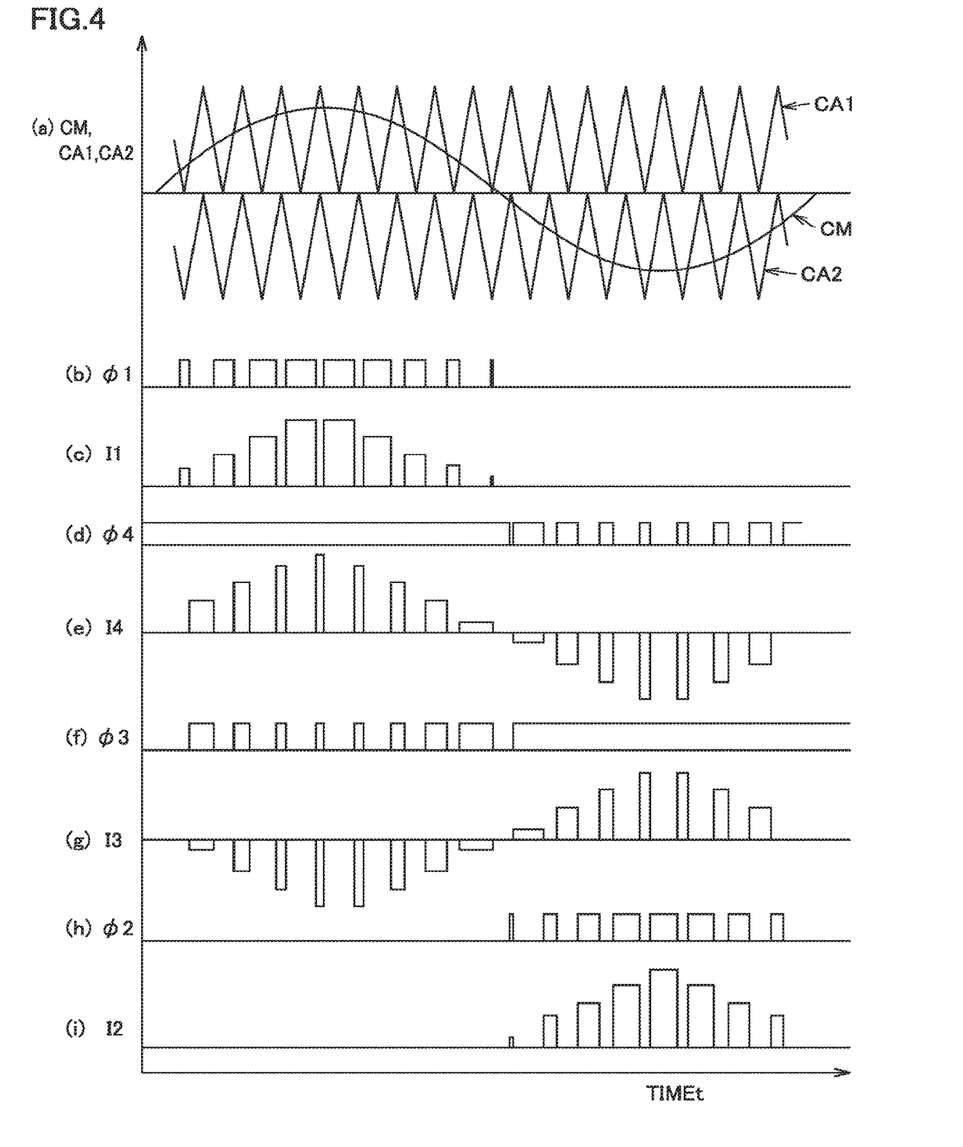
FIG. 4 is a time chart showing the current flowing through the inverter shown in FIG. 1.

FIGS. 4(a) to 4(i) are time charts each showing the operation of the inverter. Specifically, FIG. 4(a) shows waveforms of sinusoidal wave command value signal CM, positive-side triangular wave carrier signal CA1 and negative-side triangular wave carrier signal CA2. FIGS. 4(b), 4(d), 4(f), and 4(h) show waveforms of PWM signals φ1, φ4, φ3, and φ2, respectively. FIGS. 4(c), 4(e), 4(g), and 4(i) show waveforms of currents I1, I4, I3, and I2, respectively. Among currents I1 to I4, a positive current shows a current flowing through transistor Q while a negative current shows a current flowing through diode D. The figures also show the case where the power factor is 1.0.

In FIGS. 4(a) to 4(i), in a time period during which the level of sinusoidal wave command value signal CM is positive, PWM signals φ4 and φ2 are fixed at an "H" level and an "L" level, respectively, and PWM signals φ1 and φ3 are alternately set at an "H" level. Accordingly, transistors Q4 and Q2 are fixed in the ON state and the OFF state, respectively, and transistors Q1 and Q3 are alternately turned on. Thus, DC voltages V1 and V3 alternately appear on output terminal T4.

During this time period, current I1 of the level corresponding to the ON time of transistor Q1 flows when transistor Q1 is turned on, and current I3 of the level complementing current I1 flows through a passage of diode D3 and transistor Q4 when transistor Q1 is turned off.

Since transistor Q2 is fixed in the OFF state, no current flows through transistor Q2, so that switching loss does not occur in transistor Q2. Transistor Q3 is turned on/off, but a current flows through diode D3 while no current flows through transistor Q3, so that switching loss does not occur in transistor Q3. Since transistor Q4 is fixed in the ON state, a current flows through transistor Q4, but switching loss does not occur in transistor Q4. Accordingly, during this time period, among transistors Q1 to Q4, the current flowing through transistor Q1 shows the largest effective value while the greatest switching loss occurs in transistor Q1.

Each time transistor Q1 is changed from the OFF state to the ON state, a reverse bias voltage is applied to diode D3, and this diode D3 performs a reverse recovery operation. No current flows through other diodes D1, D2 and D4 during this time period.

In a time period during which the level of sinusoidal wave command value signal CM is negative, PWM signals φ3 and φ1 are fixed at an "H" level and an "L" level, respectively, and PWM signals φ2 and φ4 are alternately set at an "H" level. Accordingly, transistors Q3 and Q1 are fixed in the ON state and the OFF state, respectively, and transistors Q2 and Q4 are alternately turned on. Thus, DC voltages V2 and V3 appear alternately on output terminal T4.

During this time period, current I2 of the level corresponding to the ON time of transistor Q2 flows when transistor Q2 is turned on, and current I3 flows through a passage of diode D4 and transistor Q3 when transistor Q2 is turned off.

Since transistor Q1 is fixed in the OFF state, a current does not flow through transistor Q1, so that switching loss does not occur in transistor Q1. Although transistor Q4 is turned on/off, a current flows through diode D4 while a current does not flow through transistor Q4, so that switching loss does not occur in transistor Q4. Since transistor Q3 is fixed in the ON state, a current flows through transistor Q3, but switching loss does not occur in transistor Q3. Accordingly, during this time period, among transistors Q1 to Q4, the current flowing through transistor Q2 shows the largest effective value while the greatest switching loss occurs in transistor Q2.

Furthermore, each time transistor Q2 is changed from the OFF state to the ON state, a reverse bias voltage is applied to diode D4, and this diode D4 performs a reverse recovery operation. Also, no current flows through other diodes D1, D2 and D3 during this time period.

In summary, a large current flows through each of transistors Q1 and Q2, and thus, switching loss occurs in transistors Q1 and Q2. The current flowing through transistors Q3 and Q4 is smaller than the current flowing through transistors Q1 and Q2, and thus, switching loss does not occur in transistors Q3 and Q4.

Accordingly, as described above, as transistors Q1 and Q2, an N-channel MOS transistor is employed that is formed of SiC as a wide band gap semiconductor and that has a rated current of a relatively large value (for example, 600 A), thereby reducing switching loss. Also, as transistors Q3 and Q4, an IGBT is employed that is formed of Si as a semiconductor other than a wide band gap semiconductor and that has a rated current of a relatively small value (for example, 450 A), thereby reducing cost.

A current flowing through diodes D3 and D4 is comparable to the current flowing through transistors Q3 and Q4. These diodes D3 and D4 each perform a reverse recovery operation. No current flows through diodes D1 and D2. In addition, as is well known, diodes D1 and D2 are provided in order to protect transistors Q1 and Q2 from the voltage generated in an inductor when this inductor is used as a load.

Accordingly, as described above, as diodes D3 and D4, a Schottky barrier diode is employed that is formed of SiC as a wide band gap semiconductor and that has a rated current of a value comparable to those of transistors Q3 and Q4 (for example, 500 A), thereby reducing the recovery loss occurring during the reverse recovery operation. As diodes D1 and D2, a diode is employed that is formed of Si as a semiconductor other than a wide band gap semiconductor and that has a rated current of a relatively small value (for example, 300 A), thereby reducing cost.

Figure 5:
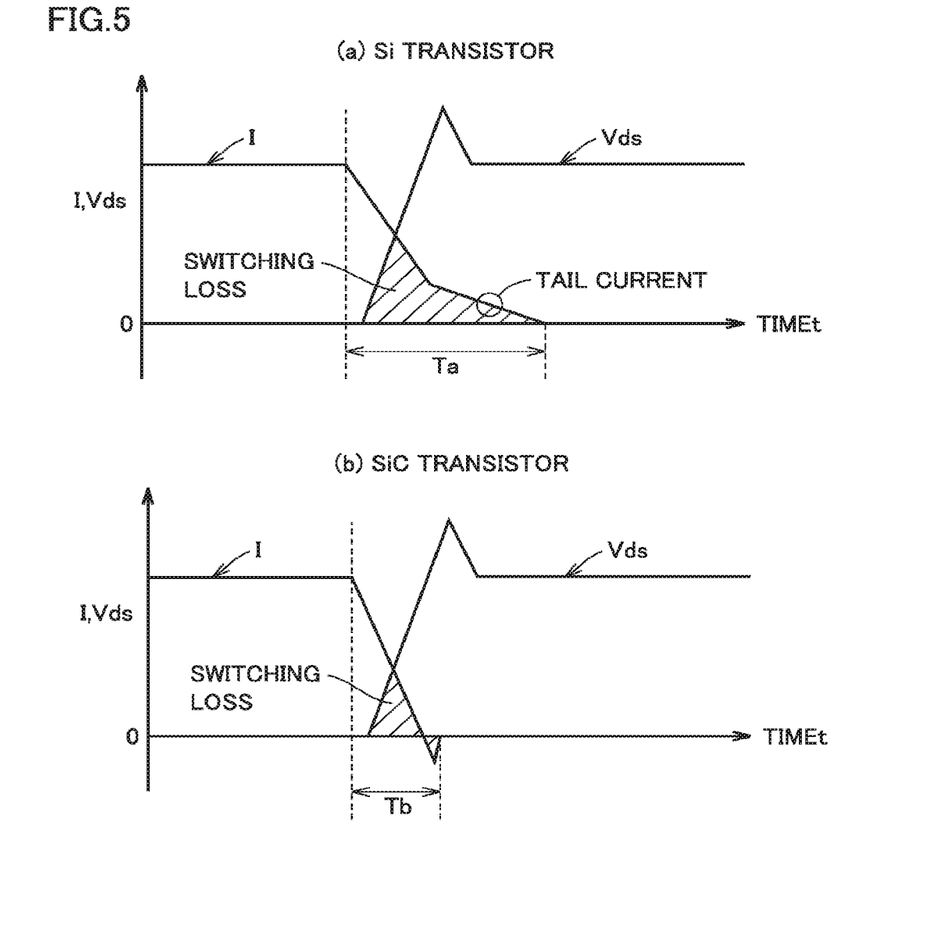
FIG. 5 is a time chart for illustrating switching loss in each of two types of transistors shown in FIG. 1.

FIG. 5(a) is a time chart showing the switching operation of an N-channel MOS transistor formed using Si (which will be referred to as a Si transistor). FIG. 5(b) is a time chart showing the switching operation of an N-channel MOS transistor formed using SiC (which will be referred to as a SiC transistor).

In FIGS. 5(a) and 5(b), in the initial state, a gate signal (not shown) is set at an "H" level to turn on the transistor, to cause a fixed current I to flow through the transistor, in which case a drain-source voltage Vds is set at 0V. When the gate signal is lowered from an "H" level to an "L" level at a certain time to turn off the transistor, current I decreases and voltage Vds increases.

As apparent from FIGS. 5(a) and 5(b), a time period Ta in the Si transistor from when current I starts to fall until when current I reaches 0 A is longer than a time period Tb in the SiC transistor from when current I starts to fall until when current I reaches 0 A. In the Si transistor, current I decreases quickly until this current I reaches a certain value. From this certain value, however, it takes long for current I to reach 0 A. The current flowing in a time period during which this current reaches 0 A from such a certain value is referred to as a tail current.

On the other hand, in the SiC transistor, current I decreases immediately and some overshoot occurs. The switching loss in the transistor is represented by the product of current I and voltage Vds, which corresponds to an area of the diagonally shaded region in the figure. Accordingly, the switching loss in the SiC transistor is smaller than the switching loss in the Si transistor.

Figure 6:
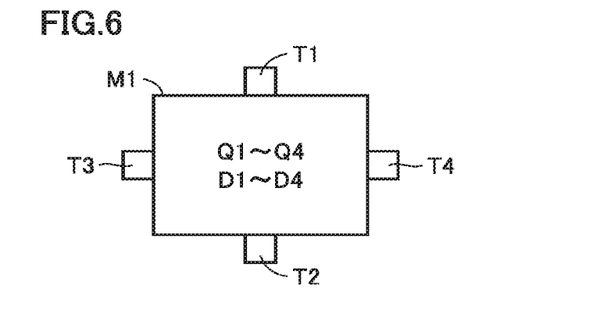
FIG. 6 is a block diagram showing the configuration of a semiconductor module included in the inverter shown in FIG. 1.

FIG. 6 is a diagram showing the external appearance of the inverter shown in FIG. 1. In FIG. 6, the inverter includes one semiconductor module M1. Semiconductor module M1 is provided on its inside with transistors Q1 to Q4 and diodes D1 to D4. Semiconductor module M1 is provided on its outside with input terminals T1 to T3 and an output terminal T4. Furthermore, semiconductor module M1 is provided on its outside with four signal terminals used for supplying PWM signals ϕ1 to ϕ4 to the gates of transistors Q1 to Q4, respectively, but these four signal terminals are not shown for simplification of illustration of the figure.

Figure 7:
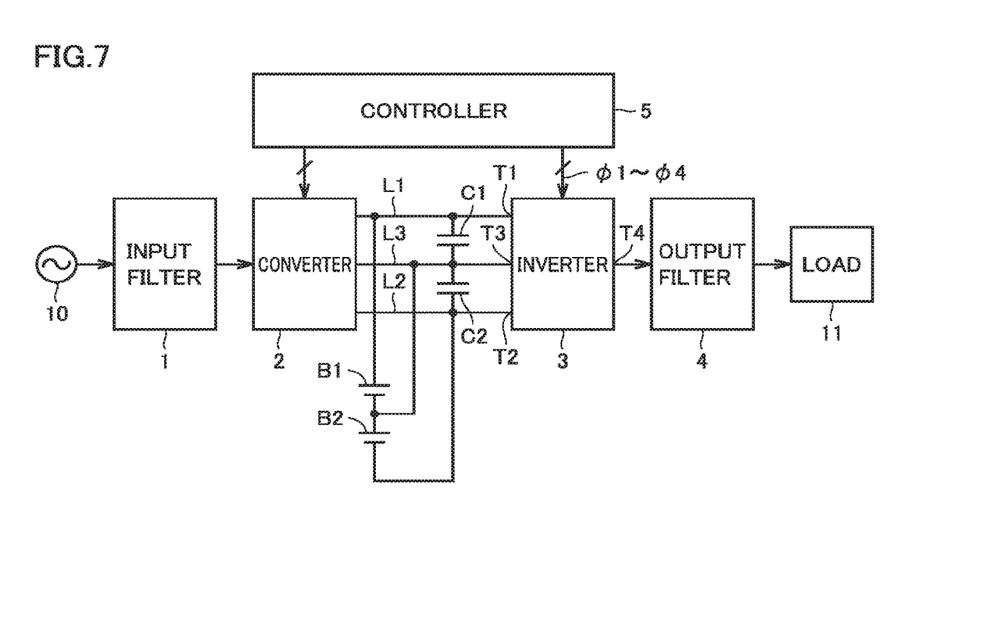
FIG. 7 is a circuit block diagram showing the configuration of an uninterruptible power supply device including the inverter shown in FIG. 1.

FIG. 7 is a circuit block diagram showing the configuration of an uninterruptible power supply device including the inverter shown in FIG. 1. In FIG. 7, the uninterruptible power supply device includes an input filter 1, a converter 2, a DC positive bus L1, a DC negative bus L2, a DC neutral point bus L3, capacitors C1, C2, an inverter 3, an output filter 4, and a controller 5.

Input filter 1 serves as a low-pass filter to allow the AC power of a commercial frequency from a commercial AC power supply 10 to flow into converter 2, and to prevent the signal of a carrier frequency generated in converter 2 from passing through to commercial AC power supply 10.

DC positive bus L1, DC negative bus L2 and DC neutral point bus L3 have one ends connected to converter 2, and the other ends connected to input terminals T1 to T3, respectively, of inverter 3. Capacitor C1 is connected between buses L1 and L3 while capacitor C2 is connected between buses L3 and L2. Buses L1 and L3 are connected to the positive electrode and the negative electrode, respectively, of battery B1 while buses L3 and L2 are connected to the positive electrode and the negative electrode, respectively, of battery B2.

In the normal situation in which AC power is normally supplied from commercial AC power supply 10, converter 2 converts the AC power supplied from commercial AC power supply 10 through input filter 1 into DC power, and supplies the DC power to each of batteries B1 and B2 and also to inverter 3. Each of batteries B1 and B2 stores DC power.

In other words, converter 2 is controlled by the PWM signals supplied from controller 5, to generate DC voltages V1 to V3 based on the AC voltage supplied from commercial AC power supply 10 through input filter 1, and then, applies generated DC voltages V1, V2 and V3 to DC positive bus L1, DC negative bus L2 and DC neutral point bus L3, respectively. In addition, when input terminal T3 is grounded, DC voltages V1, V2 and V3 are set at a positive voltage, 0V and a negative voltage, respectively. DC voltages V1 to V3 are smoothed by capacitors C1 and C2. DC voltages V1 to V3 are supplied to batteries B1, B2 and inverter 3. Converter 2 is stopped at the time of power interruption during which supply of the AC power from commercial AC power supply 10 is stopped.

As shown in FIG. 1, inverter 3 includes input terminals T1 to T3, output terminal T4, transistors Q1 to Q4, and diodes D1 to D4, and is controlled by PWM signals ϕ1 to ϕ4 from controller 5.

In the normal situation in which AC power is normally supplied from commercial AC power supply 10, inverter 3 converts the DC power generated in converter 2 into AC power. Also, at the time of power interruption during which supply of the AC power from commercial AC power supply 10 is stopped, inverter 3 converts the DC power on each of batteries B1 and B2 into AC power.

In other words, in the normal situation, inverter 3 generates a three-level AC voltage based on DC voltages V1 to V3 supplied from converter 2 through buses L1 to L3. During power interruption, inverter 3 generates a three-level AC voltage based on DC voltages V1 to V3 supplied from batteries B1 and B2 through buses L1 to L3.

Output filter 4 is connected between output terminal T4 of inverter 3 and a load 11. Output filter 4 serves as a low-pass filter to allow the AC power of a commercial frequency included in the AC power output from inverter 3 to flow into load 11, and also to prevent the signal of a carrier frequency generated in inverter 3 from passing through to load 11. In other words, output filter 4 converts the output voltage of inverter 3 into a sinusoidal wave of a commercial frequency, and supplies the sinusoidal wave to load 11.

Controller 5 is configured to control converter 2 and inverter 3 by supplying a PWM signal while monitoring the AC voltage from commercial AC power supply 10, the AC voltage output to load 11, DC voltages V1 to V3, and the like.

Then, the operation of this uninterruptible power supply device will be hereinafter described. In the normal situation in which AC power is normally supplied from commercial AC power supply 10, the AC power from commercial AC power supply 10 is supplied to converter 2 through input filter 1, and converted into DC power by converter 2. The DC power generated in converter 2 is stored in batteries B1 and B2 and also supplied to inverter 3 and converted by inverter 3 into AC power of a commercial frequency. The AC power generated in inverter 3 is supplied to load 11 through output filter 4, thereby operating load 11.

At the time of power interruption during which supply of the AC power from commercial AC power supply 10 is stopped, the operation of converter 2 is stopped, and the DC power from each of batteries B1 and B2 is supplied to inverter 3 and converted by inverter 3 into AC power of a commercial frequency. The AC power generated in inverter 3 is supplied to load 11 through output filter 4 so as to continue the operation of load 11.

Accordingly, even when power interruption occurs, the operation of load 11 is continued as long as DC power is stored in each of batteries B1 and B2. When supply of the AC power from commercial AC power supply 10 is resumed, the operation of converter 2 is resumed. Then, the DC power generated in converter 2 is supplied to each of batteries B1, B2 and inverter 3, so that its original state is brought back.

As described above, in the present first embodiment, an N-channel MOS transistor formed of a wide band gap semiconductor is used as transistors Q1 and Q2 turning on/off a current, and also, an IGBT formed of a semiconductor other than a wide band gap semiconductor is used as transistors Q3 and Q4 not turning on/off a current. Accordingly, the switching loss and the cost can be reduced.

Furthermore, a Schottky barrier diode formed of a wide band gap semiconductor is used as diodes D3 and D4 performing a reverse recovery operation, and also, a diode formed of a semiconductor other than a wide band gap semiconductor is used as diodes D1 and D2 not performing a reverse recovery operation. Accordingly, the recovery loss and the cost can be reduced.

In addition, SiC is used as a wide band gap semiconductor in the present first embodiment, but not limited thereto, and any other semiconductors may be used as long as such semiconductors are a wide band gap semiconductor. For example, GaN (gallium nitride) may be used as a wide band gap semiconductor.

Figure 8:
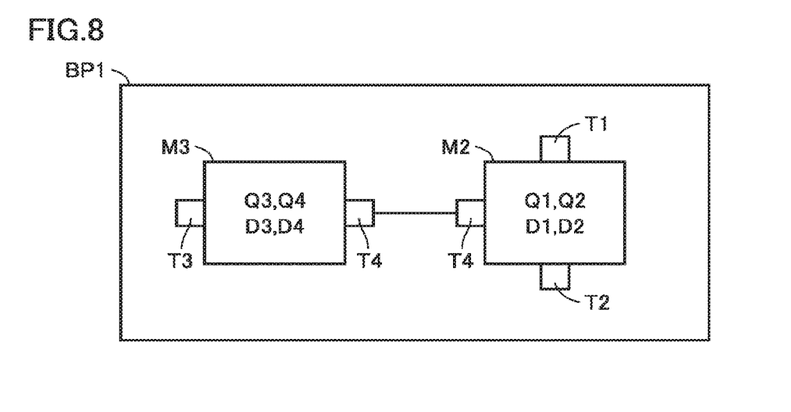
FIG. 8 is a circuit block diagram showing a modification of the first embodiment.

FIG. 8 is a block diagram showing a modification of the first embodiment, which is shown as compared with FIG. 6. In FIG. 8, in the present modification, an inverter includes a substrate BP1, and two semiconductor modules M2 and M3 mounted on its surface. Semiconductor module M2 is provided on its inside with transistors Q1, Q2 and diodes D1, D2. Semiconductor module M2 is provided on its outside with input terminals T1, T2 and an output terminal T4. Furthermore, semiconductor module M2 is provided on its outside with two signal terminals (not shown) used for supplying PWM signals $\phi1$ and $\phi2$ to the gates of transistors Q1 and Q2.

Semiconductor module M3 is provided on its inside with transistors Q3, Q4 and diodes D3, D4. Semiconductor module M3 is provided on its outside with an input terminal T3 and an output terminal T4. Semiconductor module M3 is provided on its outside with two signal terminals (not shown) used for supplying PWM signals $\phi3$ and $\phi4$ to the gates of transistors Q3 and Q4. Output terminal T4 of semiconductor module M2 and output terminal T4 of semiconductor module M3 are connected to each other. The same effect as that in the first embodiment can be achieved also in the present modification.

Figure 9:
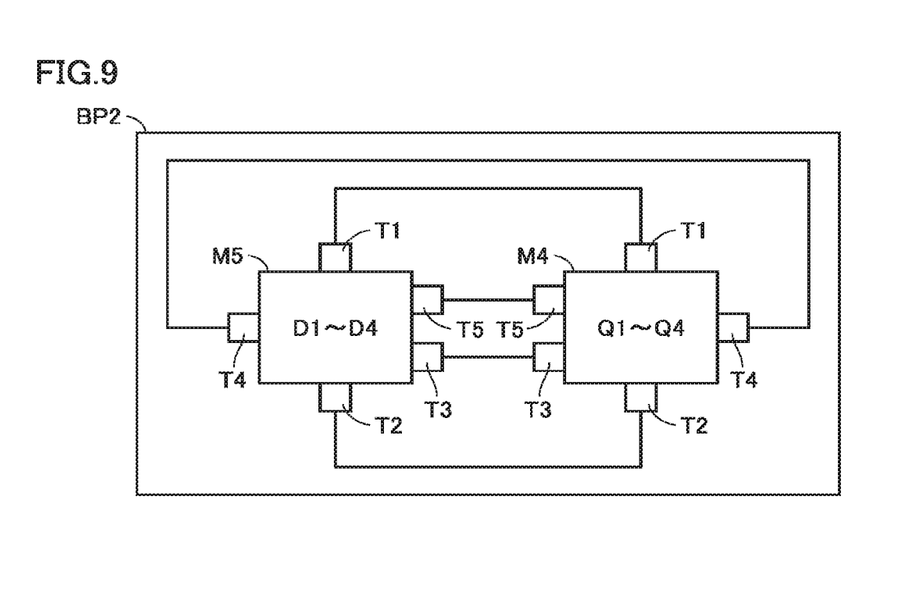
FIG. 9 is a circuit block diagram showing another modification of the first embodiment.

FIG. 9 is a block diagram showing another modification of the first embodiment, which is shown as compared with FIG. 6. In FIG. 9, in the present modification, an inverter includes a substrate BP2, and two semiconductor modules M4 and M5 mounted on its surface. Semiconductor module M4 is provided on its inside with transistors Q1 to Q4. Semiconductor module M4 is provided on its outside with input terminals T1 to T3, an output terminal T4, and an intermediate terminal T5. Intermediate terminal T5 is connected to each of emitters of transistors Q3 and Q4. Semiconductor module M4 is provided on its outside with four signal terminals (not shown) used for supplying PWM signals $\phi1$ to $\phi4$ to the gates of transistors Q1 and Q4.

Semiconductor module M5 is provided on its inside with diodes D1 to D4. Semiconductor module M5 is provided on its outside with input terminals T1 to T3, an output terminal T4, and an intermediate terminal T5. Intermediate terminal T5 is connected to each of anodes of diodes D3 and D4. Terminals T1 to T5 of semiconductor module M4 are connected to terminals T1 to T5, respectively, of semiconductor module M5. The same effect as that in the first embodiment can be achieved also in the present modification.

Figure 10:
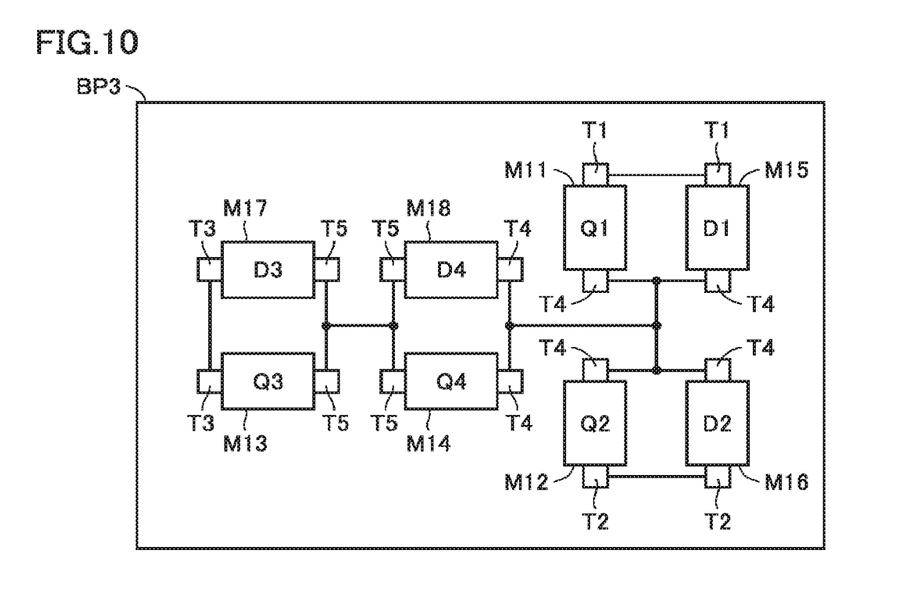
FIG. 10 is a circuit block diagram showing still another modification of the first embodiment.

FIG. 10 is a block diagram showing still another modification of the first embodiment, which is shown as compared with FIG. 6. In FIG. 10, in the present modification, an inverter includes a substrate BP3 and eight semiconductor modules M11 to M18 mounted on its surface. Semiconductor modules M11 to M14 are provided on their insides with transistors Q1 to Q4, respectively. Semiconductor modules M15 to M18 are provided on their insides with diodes D1 to D4, respectively. Each of semiconductor modules M11 and M15 includes terminals T1 and T4. Each of semiconductor modules M12 and M16 includes terminals T2 and T4. Terminals T1 of semiconductor modules M11 and M15 are connected to each other. Terminals T2 of semiconductor modules M12 and M16 are connected to each other.

Each of semiconductor modules M13 and M17 includes terminals T3 and T5. Each of semiconductor modules M14 and M18 includes terminals T4 and T5. Terminals T5 of semiconductor modules M13 and M14 are connected to collectors of transistors Q3 and Q4, respectively. Terminals T5 of semiconductor modules M17 and M18 are connected to cathodes of diodes D3 and D4, respectively. Terminals T3 of semiconductor modules M13 and M17 are connected to each other. Terminals T5 of semiconductor modules M13, M14, M17, and M18 are connected to each other. Terminals T4 of semiconductor modules M11, M12, M14 to M16, and M18 are connected to each other. Furthermore, semiconductor modules M11 to M14 are provided on their outsides with four signal terminals (not shown) used for supplying PWM signals $\phi1$ to $\phi4$ to the gates of transistors Q1 to Q4, respectively. The same effect as that in the first embodiment can be achieved also in the present modification.

Second Embodiment

Figure 11:
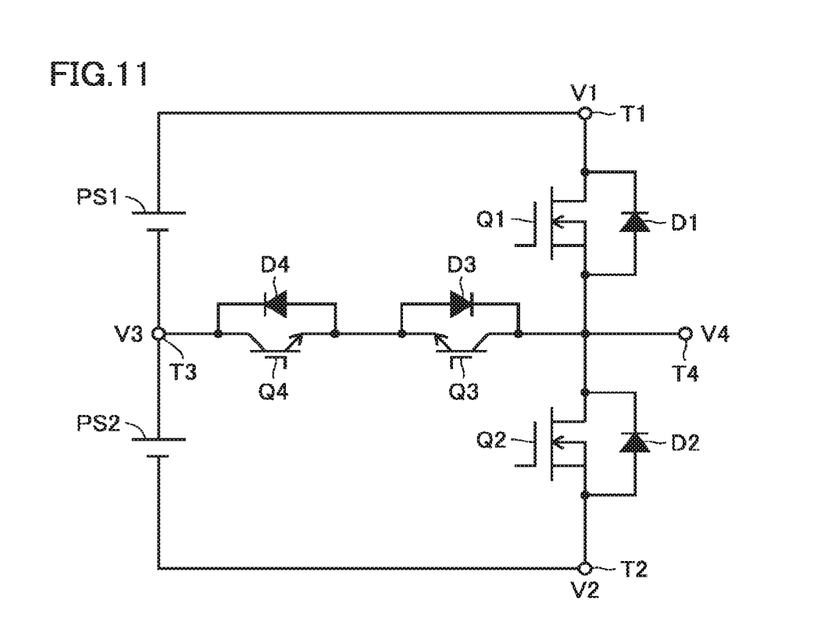
FIG. 11 is a circuit block diagram showing the configuration of an inverter according to the second embodiment of the present invention.

FIG. 11 is a circuit diagram showing the configuration of an inverter according to the second embodiment of the present invention, which is shown as compared with FIG. 1. Referring to FIG. 11, this inverter is different from the inverter in FIG. 1 in that the parallel connection body formed of transistor Q3 and diode D3 and the parallel connection body formed of transistor Q4 and diode D4 are replaced with each other.

Transistors Q3 and Q4 have emitters that are connected to each other, and collectors that are connected to input terminal T3 and output terminal T4, respectively. Transistors Q1 to Q4 are controlled by PWM signals $\phi1$ to $\phi4$, respectively. When DC voltages V1 and V3 are alternately output through output terminal T4, transistor Q4 is turned on while transistors Q1 and Q3 are alternately turned on. Furthermore, when DC voltages V2 and V3 are alternately output through output terminal T4, transistor Q3 is turned on while transistors Q2 and Q4 are alternately turned on.

Since other configurations and operations are the same as those in the first embodiment, the description thereof will not be repeated. The same effect as that in the first embodiment can be achieved also in the present second embodiment.

Third Embodiment

Figure 12:
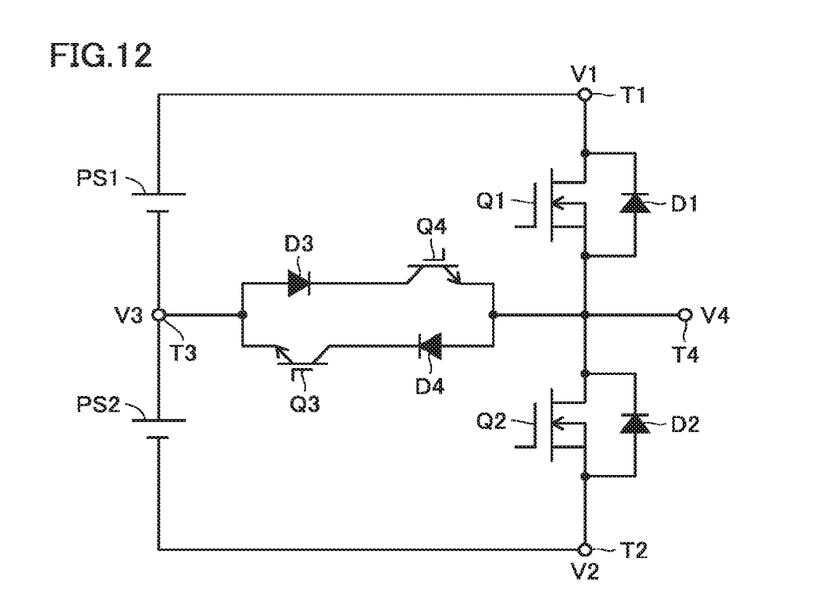
FIG. 12 is a circuit block diagram showing the configuration of an inverter according to the third embodiment of the present invention.

FIG. 12 is a circuit diagram showing the configuration of an inverter according to the third embodiment of the present invention, which is shown as compared with FIG. 1. Referring to FIG. 12, this inverter is different from the inverter in FIG. 1 in that the collectors of transistors Q3 and Q4 are separated from the cathodes of diodes D3 and D4, the collector of transistor Q3 and the cathode of diode D4 are connected to each other, and the collector of transistor Q4 and the cathode of diode D3 are connected to each other.

Transistors Q1 to Q4 are controlled by PWM signals $\phi1$ to $\phi4$, respectively. When DC voltages V1 and V3 are alternately output through output terminal T4, transistor Q4 is turned on while transistors Q1 and Q3 are alternately turned on. Furthermore, when DC voltages V2 and V3 are alternately output through output terminal T4, transistor Q3 is turned on while transistors Q2 and Q4 are alternately turned on.

Since other configurations and operations are the same as those in the first embodiment, the description thereof will not be repeated. The same effect as that in the first embodiment can be achieved also in the present third embodiment.

It should be understood that the embodiments disclosed herein are illustrative and non-restrictive in every respect.

The scope of the present invention is defined by the terms of the claims, rather than the description above, and is intended to include any modifications within the meaning and scope equivalent to the terms of the claims.

REFERENCE SIGNS LIST

T1 to T3 input terminal; T4 output terminal; T5 intermediate terminal; Q1 to Q4 transistor; D1 to D4 diode; PS1, PS2 DC power supply; M1 to M5, M11 to M18 semiconductor module; BP1, BP2, BP3 substrate; 1 input filter; 2 converter; L1 DC positive bus; L2 DC negative bus; L3 DC neutral point bus; B1, B2 battery; C1, C2 capacitor; 3 inverter; 4 output filter; 5 controller; 10 commercial AC power supply; 11 load.

The invention claimed is:

1. An inverter configured to convert a first DC voltage applied to a first input terminal, a second DC voltage applied to a second input terminal, and a third DC voltage applied to a third input terminal into a three-level AC voltage, and output the three-level AC voltage through an output terminal, the inverter comprising:
 a first transistor having a first electrode and a second electrode that are connected to the first input terminal and the output terminal, respectively;
 a second transistor having a first electrode and a second electrode that are connected to the output terminal and the second input terminal, respectively;
 a first diode and a second diode connected in anti-parallel to the first transistor and the second transistor, respectively; and
 a bidirectional switch connected between the third input terminal and the output terminal,
 the first DC voltage being higher than the second DC voltage, and the third DC voltage being an intermediate voltage between the first DC voltage and the second DC voltage,
 the bidirectional switch including a third transistor, a fourth transistor, a third diode, and a fourth diode,
 each of the first transistor, the second transistor, the third diode, and the fourth diode being formed of a wide band gap semiconductor,
 each of the third transistor, the fourth transistor, the first diode, and the second diode being formed of a semiconductor other than the wide band gap semiconductor, and
 each of the first transistor and the second transistor being greater in rated current than each of the third transistor, the fourth transistor, the first diode, the second diode, the third diode, and the fourth diode.

2. The inverter according to claim 1, wherein
 a first electrode of the third transistor and a first electrode of the fourth transistor are connected to each other,
 a second electrode of the third transistor is connected to the third input terminal,
 a second electrode of the fourth transistor is connected to the output terminal,
 the third diode and the fourth diode are connected in anti-parallel to the third transistor and the fourth transistor, respectively,
 when the first DC voltage and the third DC voltage are alternately output through the output terminal, the fourth transistor is turned on and the first transistor and the third transistor are alternately turned on, and
 when the second DC voltage and the third DC voltage are alternately output through the output terminal, the third transistor is turned on and the second transistor and the fourth transistor are alternately turned on.

3. The inverter according to claim 1, wherein
 a first electrode of the third transistor is connected to the output terminal,
 a first electrode of the fourth transistor is connected to the third input terminal,
 a second electrode of the third transistor and a second electrode of the fourth transistor are connected to each other,
 the third diode and the fourth diode are connected in anti-parallel to the third transistor and the fourth transistor, respectively,
 when the first DC voltage and the third DC voltage are alternately output through the output terminal, the fourth transistor is turned on and the first transistor and the third transistor are alternately turned on, and
 when the second DC voltage and the third DC voltage are alternately output through the output terminal, the third transistor is turned on and the second transistor and the fourth transistor are alternately turned on.

4. The inverter according to claim 1, wherein
 the third diode and the fourth diode have
  anodes that are connected to the third input terminal and the output terminal, respectively, and
  cathodes that are connected to a first electrode of the fourth transistor and a first electrode of the third transistor, respectively,
 a second electrode of the third transistor is connected to the third input terminal,
 a second electrode of the fourth transistor is connected to the output terminal,
 when the first DC voltage and the third DC voltage are alternately output through the output terminal, the fourth transistor is turned on and the first transistor and the third transistor are alternately turned on, and
 when the second DC voltage and the third DC voltage are alternately output through the output terminal, the third transistor is turned on and the second transistor and the fourth transistor are alternately turned on.

5. The inverter according to claim 1, further comprising a semiconductor module including the first transistor, the second transistor, the third transistor, the fourth transistor, the first diode, the second diode, the third diode, and the fourth diode.

6. The inverter according to claim 1, further comprising:
 a first semiconductor module including the first transistor, the second transistor, the first diode, and the second diode; and
 a second semiconductor module including the third transistor, the fourth transistor, the third diode, and the fourth diode.

7. The inverter according to claim 1, further comprising:
 a first semiconductor module including the first transistor, the second transistor, the third transistor, and the fourth transistor; and
 a second semiconductor module including the first diode, the second diode, the third diode, and the fourth diode.

8. The inverter according to claim 1, further comprising a first semiconductor module including the first transistor, a second semiconductor module including the second transistor, a third semiconductor module including the third transistor, a fourth semiconductor module including the fourth transistor, a fifth semiconductor module including the first diode, a sixth semiconductor module including the second diode, a seventh semiconductor module including the third diode, and an eighth semiconductor module including the fourth diode.

9. The inverter according to claim 1, wherein the wide band gap semiconductor is SiC, and the semiconductor other than the wide band gap semiconductor is Si.

10. The inverter according to claim 1, wherein each of the third diode and the fourth diode is greater in rated current than each of the first diode and the second diode.

\* \* \* \* \*